(12) United States Patent
Zhao et al.

(10) Patent No.: US 10,833,530 B2
(45) Date of Patent: Nov. 10, 2020

(54) OPTIMAL NETWORK RECONFIGURATION PATH SEARCHING BASED ON OPTIMIZATION FOR NETWORKS INCLUDING RENEWABLE SOURCES

(71) Applicant: COOPER TECHNOLOGIES COMPANY, Houston, TX (US)

(72) Inventors: Dongbo Zhao, Darien, IL (US); Jalpa Kaushil Shah, Woodbury, MN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 728 days.

(21) Appl. No.: 15/367,617

(22) Filed: Dec. 2, 2016

(65) Prior Publication Data
US 2018/0159365 A1 Jun. 7, 2018

(51) Int. Cl.
*H02J 13/00* (2006.01)
*H02J 3/00* (2006.01)
(Continued)

(52) U.S. Cl.
CPC ............ *H02J 13/00* (2013.01); *G05B 13/021* (2013.01); *H02J 3/00* (2013.01); *H02J 3/0073* (2020.01); *H02J 3/382* (2013.01); *H02J 3/383* (2013.01); *H02J 3/386* (2013.01); *G05B 2219/40458* (2013.01); *H02J 13/0075* (2013.01); *H02J 13/0086* (2013.01); *H02J 2203/20* (2020.01); *Y02E 10/563* (2013.01); *Y02E 10/763* (2013.01);
(Continued)

(58) Field of Classification Search
CPC ......... G05B 13/021; G05B 2219/40458; H02J 13/00; H02J 13/0075; H02J 13/0086; H02J 2003/007; H02J 3/00; H02J 3/006; H02J 3/382; H02J 3/383; H02J 3/386; Y02E 10/563; Y02E 10/763; Y02E 40/72; Y02E 60/76; Y02E 60/7853; Y04S 10/123; Y04S 40/126; Y04S 40/22
See application file for complete search history.

(56) References Cited

U.S. PATENT DOCUMENTS

7,751,166 B2 * 7/2010 Stoupis ............... H02J 13/0013
307/23
2012/0065804 A1 * 3/2012 Biswal ..................... H02J 3/48
700/297
(Continued)

*Primary Examiner* — Jason Lin
(74) *Attorney, Agent, or Firm* — Eckert Seamans Cherin & Mellott, LLC (57) ABSTRACT

Methods and systems for performing network reconfigurations for networks including one or more renewable energy devices are described herein. In one exemplary embodiment, a network reconfiguration engine is used to determine an energy level of one or more renewable energy devices within the network. The reconfiguration engine is then capable of determining an optimal path for the network reconfiguration such that a least portion of the network's load is impacted, as well as a minimal number of switching operations are needed. The optimal path also, in one embodiment, includes performing a resiliency estimation for the post-network reconfiguration topology. An updated relay setting for the post-network reconfiguration topology is determined, and a status of any other engines associated with the reconfiguration is determined, after which the network reconfiguration is performed.

20 Claims, 4 Drawing Sheets

(51) Int. Cl.
 *G05B 13/02* (2006.01)
 *H02J 3/38* (2006.01)
(52) U.S. Cl.
 CPC .............. *Y02E 40/72* (2013.01); *Y02E 60/76* (2013.01); *Y02E 60/7853* (2013.01); *Y04S 10/123* (2013.01); *Y04S 10/525* (2013.01); *Y04S 40/126* (2013.01); *Y04S 40/22* (2013.01)

(56) References Cited

U.S. PATENT DOCUMENTS

| | | | | |
|---|---|---|---|---|
| 2013/0024043 | A1* | 1/2013 | Shaffer | H02H 7/30 |
| | | | | 700/297 |
| 2015/0244297 | A1* | 8/2015 | Niemoeller | H02P 9/08 |
| | | | | 290/44 |
| 2016/0179118 | A1* | 6/2016 | Song | G05B 15/02 |
| | | | | 700/295 |
| 2017/0206284 | A1* | 7/2017 | Reese | G06F 17/5009 |
| 2017/0278199 | A1* | 9/2017 | Wu | H02J 3/46 |

\* cited by examiner

OPTIMAL NETWORK RECONFIGURATION PATH SEARCHING BASED ON OPTIMIZATION FOR NETWORKS INCLUDING RENEWABLE SOURCES

BACKGROUND OF THE INVENTION

Field

The present invention generally relates to methods for performing network reconfigurations for networks including one or more renewable energy devices that detect and receive energy from a renewable energy source. In particular, network reconfigurations are optimized to account for bi-directional energy flow from such renewable energy sources.

Background Information

Renewable energy, such as wind, solar, biological, and the like, are becoming more and more prominent in society. "Renewables," as often referred to as, are also beginning to be incorporated into distribution systems, such as power grids and communications systems. For instance, solar panels installed on the roofs of houses become part of the overall power grid, as the solar panels modify an amount of energy being received by that household, as well modifying an amount of energy being output from the household.

These renewable energy sources, however, are anything but static. Many factors play a critical role in the amount of energy that renewable energy devices, which receive energy from renewable energy sources, contribute to an overall distribution system. For example, and without limitation, an amount of energy received by a solar panel is dependent on such factors as: time of day, current weather conditions (e.g., cloudy or sunny), time of year (e.g., more solar energy received during warmer months, less solar energy received during colder months), geographical location (e.g., proximity to the equator), and the like. As another example, wind turbines contribute a different amount of energy depending on the current wind conditions (e.g., a windy day would cause more energy to be produced, while a non-windy day would cause less energy to be produced). With these types of uncertainties, it is difficult to accurately account for how much energy a renewable energy source will provide to the distribution system at any given instance.

This problem is further compounded by the fact that some distributions systems, such as mesh networks in particular, need to be substantially controllable. For example, the voltages provided locally, the load balance of feeders within a network, and the reliability of a network, need to retain some level of consistency for consumers. Without a somewhat controlled network, consumers could potentially run the risk of losing power at any given time, for any duration of time. A network that is not capable of maintaining consistent energy providing capabilities is of great concern, as this could leave individuals without power or other means. This consistency requirement is, as mentioned previously, compounded by the unpredictability of renewable energy sources as they cause their corresponding renewable energy devices to not only remove power from a power grid, but they also, and sometimes primarily, inject power into the power grid.

A wireless mesh network is a communications network configured to route data between devices within the network where devices can make use of links between multiple alternative neighbors for routing traffic across the network. Mesh networks provide reliable network communications by taking advantage of diverse link connectivity between devices to establish optimal end-to-end paths between different source and destination points within the network. Through the use of dynamic routing protocols, mesh networks are able to support continuous connectivity by adapting to changes in the availability of link connectivity between network devices.

In the utilities industry, mesh networks have been used to support the monitoring and control of various critical resources, such as electricity. In a "smart" electrical grid, for instance, various system devices (e.g., renewable energy devices, meters, transformers, other line sensor devices, etc.) are equipped with wireless communications device circuitry that allow for information exchange and remote access and control. This allows the system devices to be wirelessly connected and able to communicate with head end systems (HES), one another, and various other devices over a radio frequency medium. The communications devices act as part of a wireless mesh network supporting data relaying between devices as necessary for delivering information from an originating source to the intended destination, often a destination gateway device, which facilitates the interfacing of the system device with information or application servers, other networks, etc. Persons of ordinary skill in the art will recognize that smart grids usually include systems in which devices in the mesh network are connected to, and relies upon, the electrical grid as a primary source of power by being connected to electric feeder lines.

As an illustrative example, consider a network that includes three feeders capable of providing energy to various downstream devices (e.g., household energy receivers). If a fault occurs on one of the feeders, the downstream devices associated with that feeder will be affected. While one, or both, of the other feeders can be reconfigured to provide energy to the affected downstream devices, this causes the network topology to change. For example, the protection device(s) of the feeder(s) unaffected by the fault needs to be updated to account for the added flow from the affected feeder.

Renewable energy devices typically do not change the configuration of the network that they are part of. However, when renewable energy devices are part of a network, the reconfiguration is not capable of being performed classically, where the loads are redistributed amount the various feeders in the network, as mentioned above. This is because the settings of protective devices associated with the feeders need to be updated to account for the contributions from the renewable energy devices. As the renewable energy devices have bidirectional energy injection into faults surrounding feeders, the protection devices will need to account for the contribution of the renewable energy devices when restoring function. Furthermore, as such networks become more and more meshed, and as more and more renewable energy devices are added into the network, the problem of reconfiguring the network becomes more and more complex.

There are many challenges that arise, therefore, when incorporating renewable energy devices into a mesh network. First, there are multiple possible paths that exist for the mesh network's reconfiguration. Second, the calculation of the settings and schemes for protective devices, such as relays, are not able to be pre-set because the contributions from each renewable energy device is not able to be pre-determined. Third, the time consumed in reconfiguring the network will impact the reliability indices (e.g., SAIDI/SAIFI) as well as service to/for consumers—if the reconfiguration process is very fast, service will be restored to consumers quickly, but the reliability indicates may be impacted. Fourth, balancing the load distribution across the various feeders within the network is affected by the amount of load injected by renewable energy devices from their corresponding renewable energy source, and therefore rebalancing the load for reconfiguration is needed to reduce overloading one or more portions of the network.

There is a need for a reconfigure engine to determine an optimal path for reconfigurations of mesh networks including renewable energy devices in order to quickly and effectively reconfigure networks with minimal adverse impact to safety, performance, and reliability.

SUMMARY

These needs and others are met by embodiments of the disclosed concept, which are directed to methods and devices for transmitting communications to other devices in an ad hoc multi-hop mesh network.

As one aspect of the disclosed concept, a method for performing a reconfiguration process is described. In one embodiment, a first energy level of a first renewable energy device is determined using a reconfiguration engine. An optimal path for a network reconfiguration for a network is determined, the optimal path corresponding to a redistribution of a load for the network such that a load impact and a number of switching operations are minimized. An updated relay setting for a post-reconfiguration network topology is determined. A first status of a first engine associated with the network is determined, and, using the reconfiguration engine, the network reconfiguration is performed.

As another aspect of the disclosed concept, a system including a reconfiguration engine is described. In one embodiment, the system including the reconfiguration engine includes memory, communications circuitry, and at least one processor. The at least one processor is structured to determine a first energy level of a first renewable energy device. An optimal path for a network reconfiguration for a network is determined, the optimal path corresponding to a redistribution of a load for the network such that a load impact and a number of switching operations are minimized. An updated relay setting for a post-reconfiguration network topology is determined. A first status of a first engine associated with the network is determined, and the network reconfiguration is performed.

BRIEF DESCRIPTION OF THE DRAWINGS

A full understanding of the disclosed concept can be gained from the following description of the preferred embodiments when read in conjunction with the accompanying drawings in which.

DETAILED DESCRIPTION OF PREFERRED EMBODIMENTS

Directional phrases used herein, such as, for example, left, right, front, back, top, bottom, and derivatives thereof, related to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the statement that two or more parts are "electrically coupled" or are in "electrical communication" shall mean that two or more parts or components are joined together either directly or joined through one or more intermediate parts such that electricity, current, voltage, and/or energy is operable to flow from one part or component to the other part or component, and vice-versa.

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "dynamic range" shall mean the ratio or difference between the smallest and largest possible values of a changeable quantity (e.g., without limitation, amplitude; magnitude).

As employed herein, the singular form of "a", "an", and "the" include plural references unless the context clearly dictates otherwise.

As employed herein, a "transmitting" device or an "initiating" device refers to any device from which a communication originates, and a "receiving" device or "target" device refers to any device to which a communication is directed.

Additionally, as employed herein, the term "renewable energy device," or "renewable" refers to any device which is capable of receiving energy from a renewable energy source.

Figure 1:
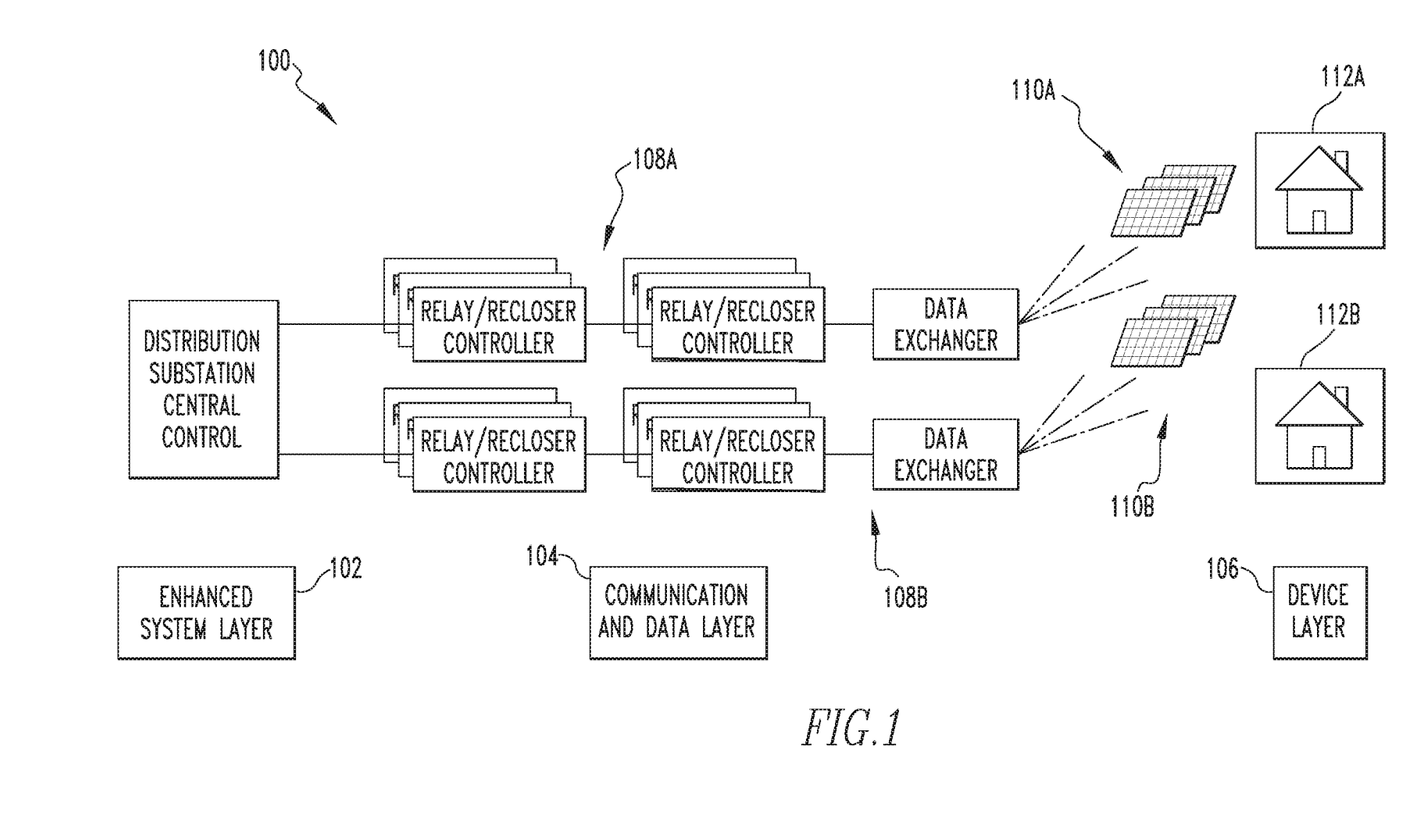
FIG. 1 is an illustrative schematic diagram of a network including renewable energy devices, in accordance with an embodiment of the disclosed concept.

FIG. 1 is an illustrative schematic diagram of a network 100 including renewable energy device, in accordance with an embodiment of the disclosed concept. In an exemplary, non-limiting embodiment, network 100 is a multi-layer network system including an enhanced system layer 102, which is in communication with a communication and data layer 104, which in turn is in communication with a device layer 106. Enhanced system layer 102, in the illustrative embodiment, corresponds to a distribution substation central control.

The distribution substation central control is capable of setting and/or calculating a given renewable energy device state, as well as determining an amount of energy being received from, or being output to, a renewable energy device. The distribution substation central control also provides/monitors the overall power grid (e.g., for fault events), and also is capable of performing state estimations. For example, the distribution substation central control monitors the energy levels along one or more feeder lines coupled thereto to determine whether or not a fault event is occurring, or is about to occur, along one of the feeder lines, or a downstream device coupled to one of the feeder lines. The distribution substation central control is also capable of controlling optimal reconfiguration for network 100, and identifying fault types and fault locations occurring within network 100. For example, the distribution substation central control, in one embodiment, includes a reconfiguration engine, a fault type identification engine, a fault location engine, and/or a resiliency engine for performing contingency analysis.

Communication and data layer 104, in the illustrative embodiment, includes a first feeder 108A and a second feeder 108B, however persons of ordinary skill in the art will recognize that network 100 may include any number of feeders, and the use of two feeders, feeders 108A and 108B, is merely exemplary. Feeders 108A and 108B, in one embodiment, facilitate communications from distribution substation central control to one or more buildings, houses, or other locations where a renewable energy device, or any other system device for network 100, may be located. Feeders 108A and 108B include SCADA/FLISR measurement devices, relay/re-closer controllers, and/or data exchange devices, for example, however persons of ordinary skill in the art will recognize that feeders 108A and 108B may include additional/alternative devices, and the number of each type of device illustrated for feeders 108A and 108B is merely exemplary.

Device layer 106, in the illustrative embodiment, includes first renewable energy device 110A associated with a first location 112A, as well as second renewable energy device 110B associated with a second location 112B. Various types of renewable energy devices 110A and 110B may include, but are not limited to, solar panels (e.g., photovoltaic meters), wind turbines, biological meters, geothermal energy meters, and hydroelectric energy meters. For example, renewable energy devices 110A and 110B may correspond to solar panels installed on, or proximate to, one or more households or buildings (e.g., locations 112A and 112B).

Figure 2A:
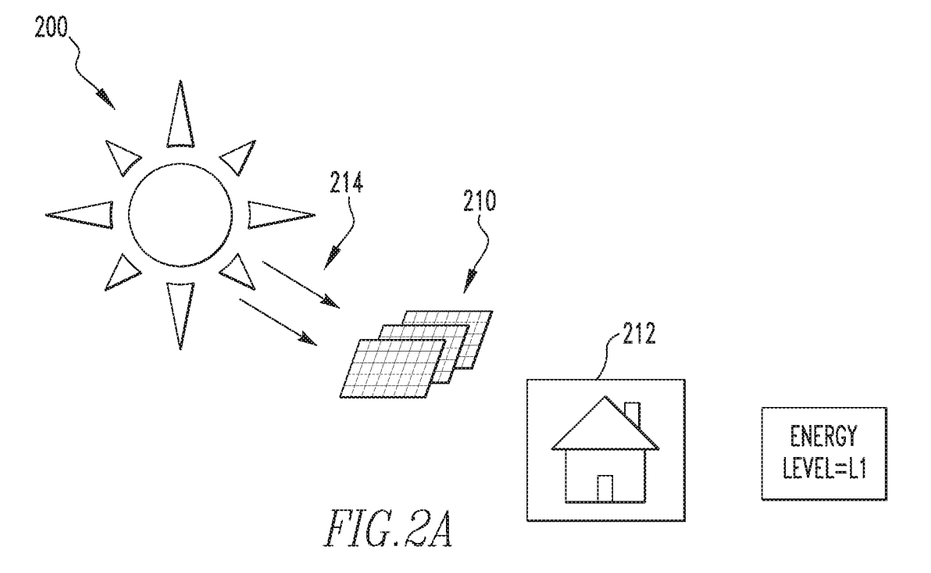
FIGS. 2A and 2B are illustrative diagrams of a renewable energy source and the impact that variability of the renewable energy source has to the energy received by a renewable energy device, in accordance with an embodiment of the disclosed concept.
Figure 2B:
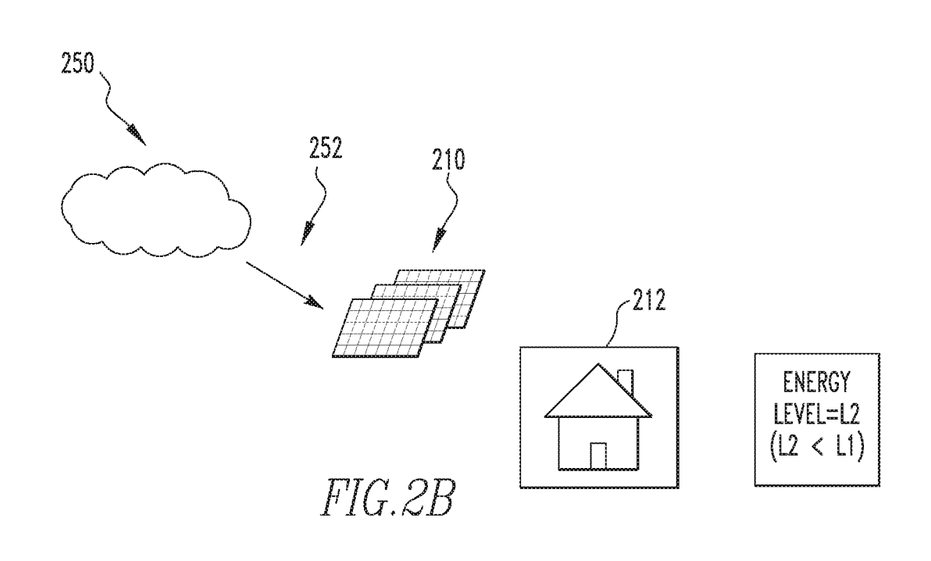

FIGS. 2A and 2B are illustrative diagrams of a renewable energy source and the impact that variability of the renewable energy source has to the energy received by a renewable energy device, in accordance with an embodiment of the disclosed concept. Diagram 200 of FIG. 2A illustrates an exemplary scenario of an amount of energy received by a solar energy source during a sunny day. For example, in diagram 200, solar panels 210 associated with household 212 received solar energy 214 from the sun. In the illustrative embodiment, the solar energy level, or amount of energy received from the sun, corresponds to an energy level L1. Diagram 250 of FIG. 2B illustrates an exemplary scenario of an amount of energy received by the solar energy source during a cloudy day. For example, in diagram 250, solar panels 210 associated with household 212 receive solar energy 252 from the sun. In the illustrative embodiment, the solar energy level, or amount of energy received from the sun, corresponds to an energy level L2. In the non-limiting embodiment, energy level L2, for instance, is less than energy level L1, indicating that on a sunny day (e.g., diagram 200 of FIG. 2A) solar panels 210 receive a greater amount of energy than on a cloudy day (e.g., diagram 250 of FIG. 2B).

As described above, the amount of energy received by a solar energy source is highly dependent on many factors, such as weather condition for example. Days where solar energy panels 210 are exposed to fewer solar rays result in less energy being received by solar energy panel 210, and therefore less energy being injected into the network (e.g., network 100 of FIG. 1) by solar panels 210. Furthermore, the amount of solar energy received by solar panels 210 is also dependent, for instance, on time of day—less energy is likely received during evening hours as opposed to daytime hours, time of year—less energy is likely received in colder months as opposed to summer months, and geographical location—more energy is likely received by solar panels located geographically proximate to the Earth's equator. Persons of ordinary skill in the art will recognize that the aforementioned are merely some of the different factors that may contribute, or affect, an amount of energy received by solar panels 210, and additional factors may also contribute to the amount of energy received thereby.

Furthermore, FIGS. 2A and 2B are meant to be illustrative examples highlighting how the amount of energy received from a renewable energy source is dependent on many factors not in control of any operator. For example, wind turbines may generate energy from wind. The amount of wind felt by the wind turbine, however, is unpredictable and varies not only from day to day, but hour to hour and minute to minute.

Figure 3:
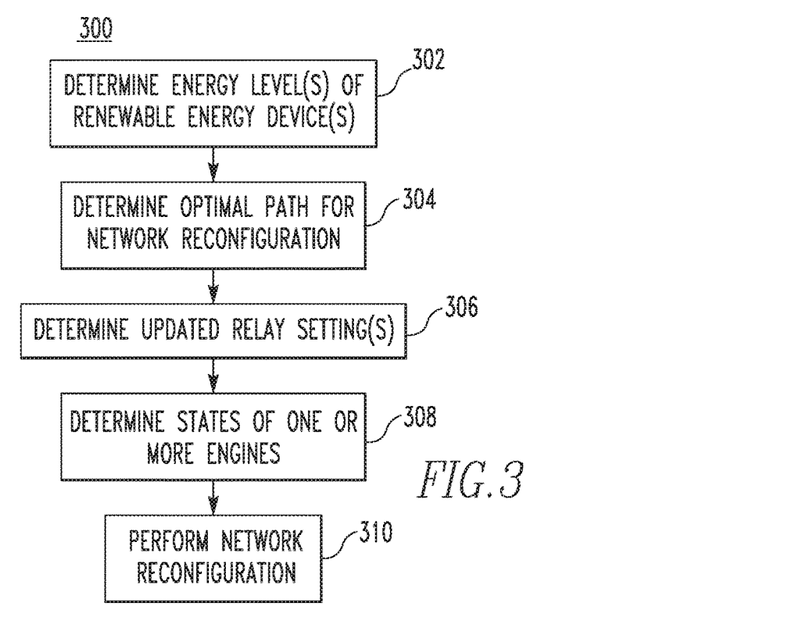
FIG. 3 is an illustrative flowchart of an exemplary process for reconfiguring a network including one or more renewable energy devices, in accordance with an embodiment of the disclosed concept.

FIG. 3 is an illustrative flowchart of an exemplary process for reconfiguring a network including one or more renewable energy devices, in accordance with an embodiment of the disclosed concept. As mentioned previously, many networks, such as power/energy grids, are beginning to include more and more renewable energy devices, such as solar panels, wind turbines, and the like. This trend is increasing now as society moves to try and be more cognizant of environmental effects, as well as developing ways for providing adequate amounts of energy to a greater number of consumers. With the addition of such renewable energy devices, greater concern and volatility also comes. Renewable energy sources are not predictable or constant, so the amount of energy renewable energy devices provide to the power/energy grid is highly dependent on the particular renewable energy source they are associated with, and the global parameters factoring into the amount of energy received from the renewable energy source. Renewable energy devices also provide bi-directional power flow to the power/energy grid—taking power from the grid as well as injecting power into the grid—which, as described above, is inherently not static and unpredictable.

When there is a fault locally, the fault typically is originating from a source. That source is primarily from a distribution substation central control, as described previously with reference to FIG. 1, and mainly is seen as a single direction power fault current injection into the fault's location. If there is a renewable energy device nearby, however, bi-directional injections into the fault may also been seen. Usually there are protective devices associated with the network's feeders (e.g., feeders 108A and 108B), however the renewable energy devices will trade off with the fault, and the settings of the protective devices will likely need to be reset to account for the renewable energy devices otherwise the protective devices will not operate correctly. For example, if a protective device is set for 20 Amps (e.g., 20 A) when there is a fault current, then that protective device is expecting a 20 A injection from the distribution substation central control to the fault's location. This may not occur if there is a renewable energy device nearby, as the renewable energy device may input additional current to, or absorb some of, that 20 A injection.

To restore service as quickly as possible, a network reconfiguration may be performed to not only isolate the fault, but to ensure that any devices/systems downstream from the affected feeder where the fault is located remain operational. However, reconfiguring networks that include renewable energy devices is not as simple as reconfiguring a network that does not include any renewable energy devices. This is because the protective devices of the feeders in a network including renewable energy devices need to be updated to account for the contributions from the renewable energy device. Generally speaking, it is desirable for the network reconfiguration to be substantially quick to allow for an associated utility agency to visit the fault location site to try and fix the fault, determine which, if any, portions of the affected feeder may be activated, and which portions, if any, should be restored.

In one embodiment, a centralized control engine employed by a network, such as network 100 of FIG. 1, would be capable of knowing all the states of all portions of the network at all times, and therefore the restoration calculation would be able to be performed quickly and substantially immediately. For example, a centralized control engine that includes a fault location engine and a fault type identification engine would allow the restoration process to be expedited. In this particular scenario, the fault location engine is structured such that the fault location engine indicates where the fault's location is so that the fault can be isolated. Locating the fault would also allow for the other parts of the network to be restored. The fault type identification engine, in one embodiment, is structured such that the fault type identification engine determines whether the fault is a permanent fault or a temporary fault. If the fault is a permanent fault, for instance, then re-closing onto the fault to determine if the fault clears is not desirable, and therefore the reconfiguration can be performed substantially immediately.

A permanent fault, as described herein, corresponds to a fault that still exists while a re-closer is "re-closing." A re-closer, for example, is type of repetitive switch that is forced to open in response to sensing a fault (e.g., an over current, under voltage), and then will re-close to the line to determine whether or not it will be forced to open again to identify whether the fault is still present. If the fault is still present, then this would be referred to as a "permanent fault." If the fault is no longer present, then this would be referred to as a "temporary fault."

Process 300, in the non-limiting exemplary embodiment, begins at step 302. At step 302, one or more energy levels, corresponding to one or more renewable energy devices within a network, may be determined. For example, a state of some or all of the renewable energy devices within a network may be measured. In one embodiment, the measurement of the energy level of a particular renewable energy device, or devices, within a network is performed by a reconfiguration engine, which is described in greater detail below with reference to FIG. 5. The reconfiguration engine, for instance, may take a measurement of an amount of energy being input into the network, as well as an amount of energy being consumed from the network, by one or more renewable energy devices. For example, a reconfiguration engine may determine that solar panel 210 of FIG. 2A is receiving energy of an energy level L1.

The measurements may be performed at any suitable temporal interval. For example, measurements of the states of the renewable energy meters may be performed every few seconds, every few minutes, hourly, daily, weekly, etc. In one embodiment, measurements of the states of the various renewable energy devices within the network are performed manually. For instance, a specific instruction to obtain a current measurement of one or more renewable energy devices may be received, and in response, a measurement of those renewable energy devices is obtained. In one embodiment, the reconfiguration engine is structured to determine an energy level associated with a renewable energy device in response to determining that there is a fault occurring near, or substantially near, the renewable energy device. This allows the reconfiguration engine to know an amount of energy that the renewable energy source contributes to the network (e.g., a bi-directional energy injection amount).

At step 304, an optimal path, or optimal paths for performing the network reconfiguration is determined. For example, one or more optimal paths that impact a minimal portion of the network's load may be determined. In one embodiment, the reconfiguration engine determines the optimal path, or the optimal paths. The optimal path searching does not need to occur all the time, however even during normal operation, an optimal path search analysis may decrease the likelihood of hazardous situations. For instance, a distribution operator at the distribution substation control center may see a potential hazard developing within the network. For example, the distribution operator may notice that a load on one feeder is increasing suddenly, and therefore will go to the reconfiguration engine to initiate a reconfiguration for the network.

The optimal path determination, which is described in greater detail below with reference to FIG. 4, in one embodiment, is designed to impact a minimal portion of the network load, while also minimizing a number of switching operations that will need to be performed. Furthermore, the optimal path determination will also account for a resilience estimation of the network post-reconfiguration. This ensures that the post-configuration system is safe and stable, and that the reconfiguration does not lead to an unstable network environment topology.

If there is a fault detected within the network, the reconfiguration engine is, in the exemplary embodiment, configured to restore a maximum portion of the load as quickly as possible. In many scenarios, the reconfiguration engine will perform the network reconfiguration in response to a fault occurring, however this need not be the only case. During normal operation, however, the restoration of power in response to a fault may not need to be performed as quickly as possible, and therefore more time for determining the optimal path may be available, however persons of ordinary skill in the art will recognize that this is merely exemplary. Furthermore, persons of ordinary skill in the art will recognize that multiple paths may be identified as being "optimal," and upon these paths being determined, the reconfiguration engine may select the path from the multiple paths identified based on any suitable criteria.

At step 306, updated relay settings are determined. Before the topology of the network is altered, the network reconfiguration is mainly performed by controlled switches within the network. For instance, relay setting updates for the network should be analyzed prior to performing the network reconfiguration as the network topology is changing, and therefore the new relay settings post-reconfiguration are needed for after the switch changing operations have been performed. As an illustrative example, if a first feeder is connected to a lower part of a second feeder, then this new topology will need to have a short circuit analysis performed to it to determine the new settings for the first and second feeders. In one embodiment, the reconfiguration engine is structured to determine updated relay settings for post-reconfiguration network topologies, and further is capable of storing these updated relay settings within its local memory. As another example, if the states of all of the renewable energy device states within the network are known, the short circuit analysis becomes a bi-directional short circuit analysis so that the injection of energy by the renewable energy source into the network from the renewable energy device is known, and therefore the relay settings can be updated accordingly.

At step 308, a state of one or more engines associated with the network reconfiguration engine is determined. In one embodiment, the network reconfiguration engine will coordinate with any other engine associated therewith for determining those engines' states. For example, the network reconfiguration engine may communicate with a fault location engine to determine its state, a fault type identification engine to determine its state, and/or a resiliency estimation engine to determine its state. As an illustrative example, if re-closer devices associated with the feeder lines (e.g., feeders 108A and 108B) are mid-cycle (e.g., not finished) with the closing cycle, then the reconfiguration process will need to wait until the closing cycle finishes in order to perform the reconfiguration. As another example, if the fault type identification engine determines that the fault is a permanent fault, then the re-closer would be locked out. The re-closer would not need to be re-closed after the fault, and therefore after the reconfiguration process would be able to be performed substantially immediately so that the reconfiguration engine does not need to wait until after the re-closing cycle completes.

At step 310, the network reconfiguration is performed. For instance, the network reconfiguration engine will allow the network to be reconfigured such that service is able to be restored to a maximum number of consumers, in as quick a time frame as possible.

The reconfiguration process, for instance, controls switches in order to change the topology of lateral/loads to one or more feeders. For example, a first, second, and third load areas (e.g., load area 1, load area 2, load area 3) may be connected to a first feeder (e.g., feeder 1), while a fourth load area and a fifth load area (e.g., load area 4, load area 5) may be connected to a second feeder (e.g., feeder 2). During reconfiguration, in one embodiment, the first load area are connected to the first feeder, while the third, fourth, and fifth load areas are connected to the second feeder. For instance, this may be due to a fault detected on the first feeder causing the second load area and the third load area to close, and thus the reconfiguration process will restores the third load area. The second load area, in this particular scenario, may be isolated to be de-energized due to the fault detected. If the reconfiguration engine were to not cause the reconfiguration process to occur, the third load area will need to be de-energized as well because it is a downstream region of the fault and power cannot come through the second load area to the third load area when there is a fault. The reconfiguration process causes a switch between the third load area and the first feeder to open, while also causing a switch between the third load area and the second feeder to close.

Figure 4:
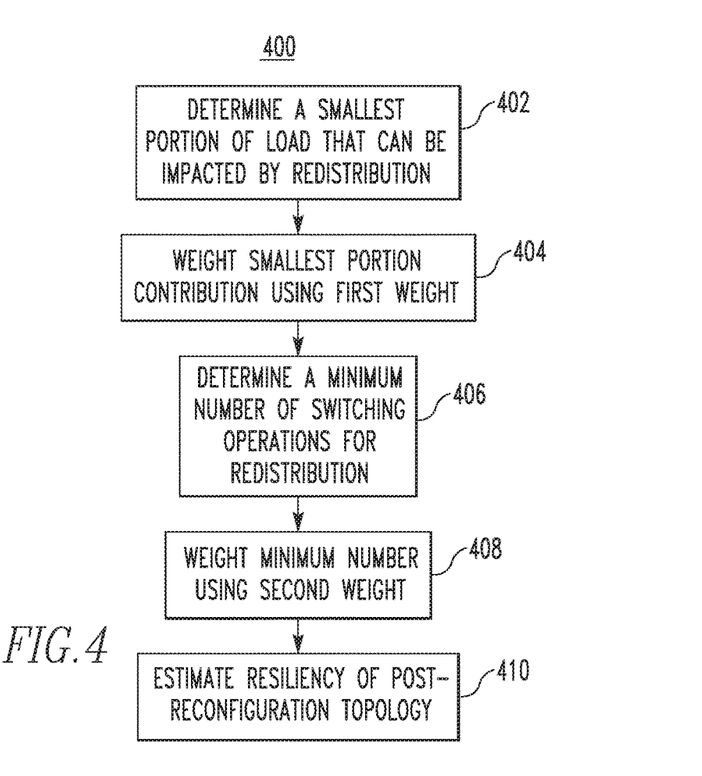
FIG. 4 is an illustrative flowchart of an exemplary process for determining an optimal path for a network reconfiguration of a network including one or more renewable energy devices, in accordance with an embodiment of the disclosed concept.

FIG. 4 is an illustrative flowchart of an exemplary process for determining an optimal path for a network reconfiguration of a network including one or more renewable energy devices, in accordance with an embodiment of the disclosed concept. As described above (e.g., with reference to step 304 of process 300 of FIG. 3), determining the optimal path for a network reconfiguration is a crucial step.

Process 400, in the non-limiting exemplary embodiment, begins at step 402. At step 402, a smallest portion of the network's load that can be impacted by the redistribution during the network reconfiguration, is determined. In one embodiment, a smallest few portions of the load having a minimal impact are determined at step 402, and persons of ordinary skill in the art will recognize that multiple portions of the load are also capable of being determined. Determining the smallest portion of the load, however, is a difficult task in mesh networks, as redistributing the load to other feeders becomes challenging as the number of feeders increases. As an illustrative example, if 20 Megawatts (e.g., 20 MW) of power is lost on a first feeder, but a second feeder has 10 MW available (sometimes referred to as a 10 MW vacancy), then distributing 10 MW from the first feeder to the second feeder is not possible, as the load cannot be isolated there. Typically, in this particular scenario, 10 MW would be moved off of the second feeder to a third feeder. After this occurs, the 20 MW from the first feeder are distributed to the second feeder, which now has a 20 MW vacancy. In this example, a total of three feeders are impacted by the redistribution of 20 MW.

However, while the aforementioned scenario is feasible, the three feeders, as well as any other feeders in the network, will sense the changing balance. Furthermore, the redistribution may cause some flow operations to have to wait a certain amount of time (e.g., a few seconds to a one minute or more) for the switching one feeder to another feeder to finish. Continuing the example above, switching the load from the second feeder to the third feeder may take a few seconds to complete. This problem may be referred to as the impact load. Generally speaking, the impact load should be minimized for the reconfiguration process. As another illustrative embodiment, it may be possible that other switching scenarios are possible, and even potentially resulting in a lesser impact load. For example, using the parameters mentioned above, the third feeder may instead have a 15 MW vacancy. In this particular scenario, it may be best to move 5 MW off of the third feeder to the second feeder, and then move the 20 MW load from the first feeder to the third feeder. This process would impact a lesser load (e.g., 5 MW as opposed to 10 MW), and therefore may be a better overall choice to use. As the mesh network becomes more and more complex, the number of possible choices for decreasing, or minimizing, the impact load, will increase, and all of the different possibilities will need to be determined.

At step 404, a first weight may be used to weight the smallest portion contribution determined by step 402. For instance, if multiple portions are determined to minimally impact the load, each portion may be weighted based on the particular impact that that load has. For example, using the illustrative examples described above, a first weighting may be applied to the two scenarios such that the scenario where the smaller load (e.g., 5 MW) receives a larger weighting than the larger load (e.g., 10 MW). This allows for the optimal path searching to account for the various possibilities available for redistributing the load.

At step 406, a minimum number of switching operations needed for the redistribution is determined. Generally, any portion of the load is capable of being distributed to any number of feeders, however the switching operations should not be too frequent. For instance, the number of switching operation may typically be less than ten. Using the example above, the number of switching operations number is two. In one embodiment, a highly "meshed" network includes an increased number of switching operation (e.g., twenty switching operations). At step 408, the minimum numbers are weighted using a second weight. Similarly to how multiple portions may be determined to minimally impact the load (e.g., step 402), multiple switching operations may be determined to be minimal. For example, one possible distribution may involve three switching operations, whereas another distribution may involve ten switching operations. Each of these distributions may be identified and weighted, where the fewer the number of switching operations, the higher the weighting that that particular distribution scheme may receive.

The first weighting and the second weighting, in the exemplary embodiment, conflict with one another. For instance, in order to impact the least portion of the load, a large number of switching operations likely will be needed. Conversely, in order to perform a minimum number of switching operations, a larger load will likely be impacted. Therefore, the selection of the minimum number of switches and the least impactful load for the reconfiguration will be optimized based on the first and second weightings. In one embodiment, the first weighting, corresponding to impacting the least portion of the load, is weighted higher than the second weighting, corresponding to the minimum number of switching operations, however persons of ordinary skill in the art will recognize that this is merely exemplary. For example, the second weighting may be weighted higher than the first weightings, or the first weightings and the second weighting may be weighted substantially equal to one another.

At step 410, a resiliency of the post-reconfiguration network topology is estimated. The resiliency estimation, in one embodiment, includes a contingency analysis and a feeder balancing analysis. The reconfiguration engine may include a resiliency estimation engine for performing the resiliency estimation, however this is only exemplary, and the resiliency estimation may be performed by one or more resilience engines not included by the reconfiguration engine.

The resiliency estimation engine interacts with other engines to perform the resiliency estimation, similar to the contingency analysis. For some particular scenarios, such as post-fault analysis, N-1, N-2, N-3, etc., contingency analysis and feeder balancing, incorporation of the resiliency estimation into the optimal path searching determination occurs. If the network topology changes, the contingency analysis will produce a poor result, which will therefore be known prior to performing the resiliency estimation. The poor result can therefore, in one embodiment, be weighted in the optimal path determination, and thereby leverages for future reconfigurations as possible outcomes.

An N-1 contingency analysis, for instance, corresponds to a scenario where one of the components of the network fails, and the impact that such a fail has on the whole power grid. If the N-1 contingency analysis produces a very poor result, then after performing the reconfiguration in this manner, the network will likely not be very resilient. As an illustrative example, transmission systems have strict limits for the transmission lines so that voltage does not exceed a predefined voltage limit. If one of the transmission lines fails, then the system will be in a hazardous conditions. If so, then this particular component (e.g., the transmission line), is referred to as a "critical component." In this case, backups can be built for the critical component, or critical components, such that it is unlikely that of these components (e.g., two transmission lines), both the primary component and the backup component will fail simultaneously. However, if both the primary component and the backup component do fail, this is referred to as an N-2 scenario, and similar contingency analysis may be performed for these types of situations. Typically, N-1 contingency analysis is accounted for during the reconfiguration, or network planning phase. During operation, knowledge of the operating states of the network may be employed to know whether something that happens is severe enough that rebalancing of the load is needed.

Process 400, in one embodiment, determines the optimize path usually by having a higher emphasis (e.g., greater weighting) for the least portion of the load and minimal number of switching operations as compared to the contingency analysis engine to see if a particular path is, in fact, an optimal path. If the determined path is not acceptable, such that an unbalanced, slow, or disruptive reconfiguration of the network occurs, then the reconfiguration engine may redo process 400 to determine a new optimal path. Furthermore, previous results for the contingency analysis as related to the resiliency estimation are capable of being used to weight the resilience estimation of step 410 for future optimal path searches.

Figure 5:
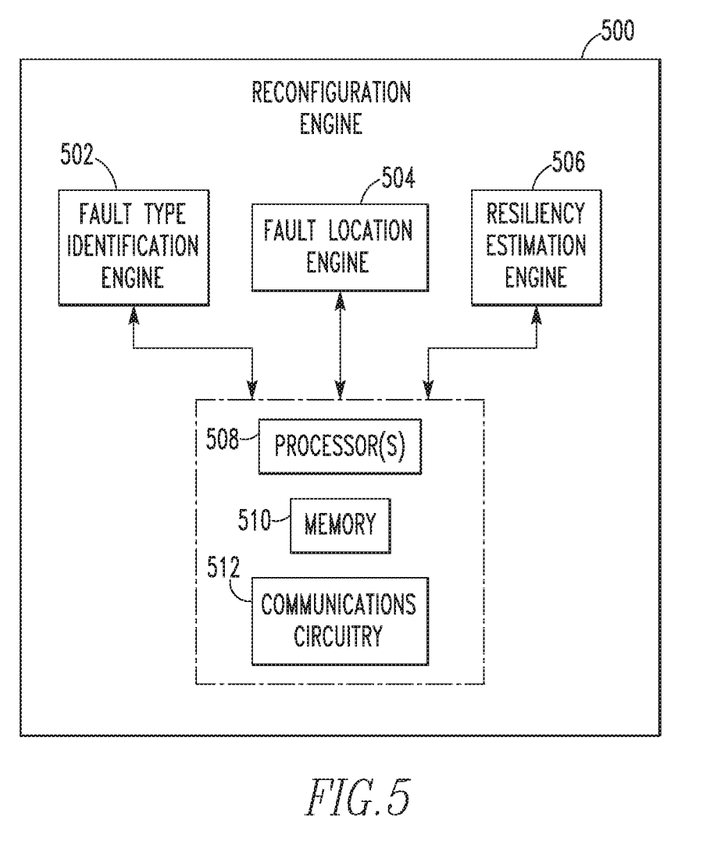
FIG. 5 is an illustrative block diagram of an exemplary reconfiguration engine for a network including one or more renewable energy devices, in accordance with an embodiment of the disclosed concept.

FIG. 5 is an illustrative block diagram of an exemplary reconfiguration engine 500, in accordance with an embodiment of the disclosed concept. In the non-limiting, exemplary embodiment, reconfiguration engine 500 includes a fault identification engine 502, a fault location engine 504, and a resiliency estimation engine 506. Persons of ordinary skill in the art will recognize that multiple instances of fault identification engine 502, fault location engine 504, and resiliency estimation engine 506 may be included, and one or more of fault identification engine 502, fault location engine 504, and resiliency estimation engine 506 may not be included by reconfiguration engine 500, and the aforementioned is merely exemplary. For example, resiliency engine 506 may be located external to reconfiguration engine 500.

Fault type identification engine 502, in one embodiment, is capable of determining a type of fault detected within a network. For example, enhanced data layer 102 may determine that a fault is occurring on feeder 108A. Fault type identification engine 502 is structured, for instance, such that it determines whether the type of fault detected by feeder 108A is a permanent fault or a temporary fault such that one or more additional processes may compensate and/or perform a certain action in response.

Fault location engine 504, in one embodiment, is capable of determining an approximate location of a fault detected within the network. For example, enhanced data layer 102 may determine that a fault is occurring within network 100, and fault location engine 504 may be capable of determining that the fault is occurring on a particular feeder line, such as feeder 108A. In one embodiment, fault location engine 504 is capable of isolating the fault, and notifying one or more additional systems or modules of the faults presence.

Resiliency estimation engine 506, in one embodiment, is capable of determining a resiliency estimate for a post-reconfiguration network topology. For example, resiliency estimation engine 506 may include a contingency analysis engine that analyzes the viability and resiliency of a network topology based on various possible events, such as N-1, N-2, N-3, etc., contingencies.

Reconfiguration engine 500, in one embodiment, also includes one or more processors 508, memory 510, and communications circuitry 512. However, reconfiguration engine 500, in one embodiment, also is capable of including one or more transmitters and receivers, a data source, an interface, a meter, and/or a power supply. Further still, one or more of the previously mentioned components may be omitted or combined, and/or one or more additional components may be added. For example, reconfiguration engine may include multiple instances of one or more of the components described above, however for simplicity, only one of each component has been shown. In one embodiment, reconfiguration engine 500 includes digital to analog (D/A) and/or analog to digital (A/D) circuitry, bus circuitry, one or more ports (e.g., serial port, USB port), a parallel portion, or any other port or circuitry, or any combination thereof.

Processor(s) 508 includes any processing circuitry, such as one or more processors capable of controlling operations and functionality of the device. In one embodiment, processor(s) 508 facilitates communications between various components within the device. For example, processor 508 may oversee and coordinate functionality of various transmitters and receivers. Processor 508, in one exemplary embodiment, runs an operating system of the device, applications resident on the device, firmware applications, media applications, software resident on the device, or any other type of application, or any combination thereof. In one embodiment, processor(s) 508 detects inputs and/or relates detected inputs to one or more actions to be performed on or by the device. For example, processor 508, in one embodiment, communicates with an interface such that inputs to the interface are recognized and processed accordingly.

In a non-limiting embodiment, processor(s) 508 is capable of determining an optimal path for network reconfigurations. Processor(s) 508 coordinates with memory 510, and communications circuitry 512 to determine various settings and states of devices, such as renewable energy devices, in communications with reconfiguration engine 500. Processor 508 may be further structured to coordinate with one or more of fault type identification engine 502, fault location engine 504, and/or resiliency estimation engine 506.

Memory 510 includes one or more storage mediums. Various types of storage mediums include, but are not limited to, hard-drives, solid state drives, flash memory, permanent memory (e.g., ROM), or any other storage type, or any combination thereof. Any form of data, such as photographs, music, files, videos, applications, and/or documents, is capable of being stored within memory 510. Memory 510, in one embodiment, also corresponds to memory. For example, memory 510 may include cache memory, semi-permanent memory (e.g., RAM), or any other type of memory. In one embodiment, a separate memory component, or separate memory components, are included. In one non-limiting embodiment, memory 510 stores routing information, such as a routing table, for devices within a network. The routing table stored by memory 510 includes various other communications devices within a network, such as network 100 of FIG. 1. Additionally, the routing table includes, amongst other features, path costs, address, identifiers (e.g., color identifiers), primary gateway devices, and/or auxiliary gateway devices associated with various communications devices within a local network.

Communications circuitry 512 includes any circuitry capable of connecting to a communications network, such as a gateway, and/or transmitting communications (e.g., data) to one or more devices and/or servers, such as a renewable energy device, or a renewable energy meter associated with a renewable energy device. Communications component 512 is capable of communicating using any suitable communications protocol including, but not limited to, Wi-Fi (e.g., 802.11 protocol), Bluetooth, radio frequency systems (e.g., 900 MHz, 1.4 GHz, and 5.6 GHz communications systems), infrared, GSM, GSM plus EDGE, CDMA, quad-band, VOIP, or any other protocol, or any combination thereof.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method, comprising: determining, using a reconfiguration engine, a first energy level of a first renewable energy device; determining an optimal path for a network reconfiguration for a network including a plurality of feeders, wherein the first renewable energy device is coupled to at least one of the plurality of feeders, the optimal path corresponding to a redistribution of a load for the network such that a load impact and a number of switching operations are minimized; determining an updated relay setting for a post-reconfiguration network topology; determining a first status of a first engine associated with the network; performing, using the reconfiguration engine, the network reconfiguration; and updating, using the reconfiguration engine, the relay setting for the post-reconfiguration network topology based on the determined updated relay settings, wherein the load impact is an amount of the load redistributed from one of the plurality of feeders to another of the plurality of feeders.

2. The method of claim 1, further comprising:
    determining, prior to determining the first energy level, that a fault event is occurring within the network.

3. The method of claim 1, further comprising:
    determining at least one second energy level associated with at least one additional renewable energy device of the network.

4. The method of claim 1, wherein determining the optimal path comprises:
    determining at least one portion of the load having a minimal load impact for the redistribution; and
    determining at least one switching operation for the redistribution that are associated with a minimal number of switching operations.

5. The method of claim 4, wherein the at least one portion is assigned a first weight and the at least one switching operation is assigned a second weight, determining the optimal path further comprises one of:
    determining the optimal path such that the first weight is weighted greater than the second weight;

determining the optimal path such that the second weight is weighted greater than the first weight; or determining the optimal path such that the first weight and the second weight are weighted substantially equal.

6. The method of claim 4, further comprising:

determining a resiliency estimate by performing a contingency analysis and a load balancing analysis for the post-reconfiguration topology.

7. The method of claim 6, wherein the at least one portion is assigned a first weight, the at least one switching operation is assigned a second weight, and the resiliency estimate is assigned a third weight, determining the optimal path comprises:

determining the optimal path using the first weight, the second weight, and the third weight.

8. The method of claim 1, wherein determining the updated relay setting comprises:

performing at least one short circuit analysis for the network.

9. The method of claim 1, further comprising:

coordinating operations for the network reconfiguration with at least one of a fault type identification engine, a fault location engine, and a resiliency engine.

10. The method of claim 1, wherein determining the first status comprises:

determining that at least one portion of the network is not available; and determining an amount of time until the at least one portion is available such that the network reconfiguration is capable of being performed after the amount of time has elapsed.

11. A system including a reconfiguration engine, comprising: memory; communications circuitry; and at least one processor structured to: determine a first energy level of a first renewable energy device; determine an optimal path for a network reconfiguration for a network including a plurality of feeders, wherein the first renewable energy device is coupled to at least one of the plurality of feeders, the optimal path corresponding to a redistribution of a load for the network such that a load impact and a number of switching operations are minimized; determine an updated relay setting for a post-reconfiguration network topology; determine a first status of a first engine associated with the network; perform the network reconfiguration; and update the relay setting for the post-reconfiguration network topology based on the determined updated relay setting wherein the load impact is an amount of the load redistributed from one of the plurality of feeders to another of the plurality of feeders.

12. The system of claim 11, wherein the at least one processor is further structured to:

determine, prior to determining the first energy level, that a fault event is occurring within the network.

13. The system of claim 11, wherein the at least one processor is further structured to:

determine at least one second energy level associated with at least one additional renewable energy device of the network.

14. The system of claim 11, wherein the determination of the optimal path corresponds to the at least one processor being further structured to:

determine at least one portion of the load having a minimal load impact for the redistribution; and determine at least one switching operation for the redistribution that are associated with a minimal number of switching operations.

15. The system of claim 14, wherein the at least one portion is assigned a first weight and the at least one switching operation is assigned a second weight, determination of the optimal path corresponds to the at least one processor being further structured to one of:

determine the optimal path such that the first weight is weighted greater than the second weight;

determine the optimal path such that the second weight is weighted greater than the first weight; or determine the optimal path such that the first weight and the second weight are weighted substantially equal.

16. The system of claim 14, wherein the at least one processor is further structured to:

determine a resiliency estimate by performing a contingency analysis and a load balancing analysis for the post-reconfiguration topology.

17. The system of claim 16, wherein the at least one portion is assigned a first weight, the at least one switching operation is assigned a second weight, and the resiliency estimate is assigned a third weight, determination of the optimal path corresponds to the at least one processor being further structured to:

determine the optimal path using the first weight, the second weight, and the third weight.

18. The system of claim 11, wherein determination of the updated relay setting corresponds to the at least one processor being further structured to:

perform at least one short circuit analysis for the network.

19. The system of claim 11, wherein the at least one processor is further structured to:

coordinate operations for the network reconfiguration with at least one of a fault type identification engine, a fault location engine, and a resiliency engine.

20. The system of claim 11, wherein determination of the first status corresponds to the at least one processor being further structured to:

determine that at least one portion of the network is not available; and determine an amount of time until the at least one portion is available such that the network reconfiguration is capable of being performed after the amount of time has elapsed.

* * * * *